F. ANTONIETTI.
FIRE HYDRANT AND COUPLING THEREFOR.
APPLICATION FILED APR. 22, 1918.

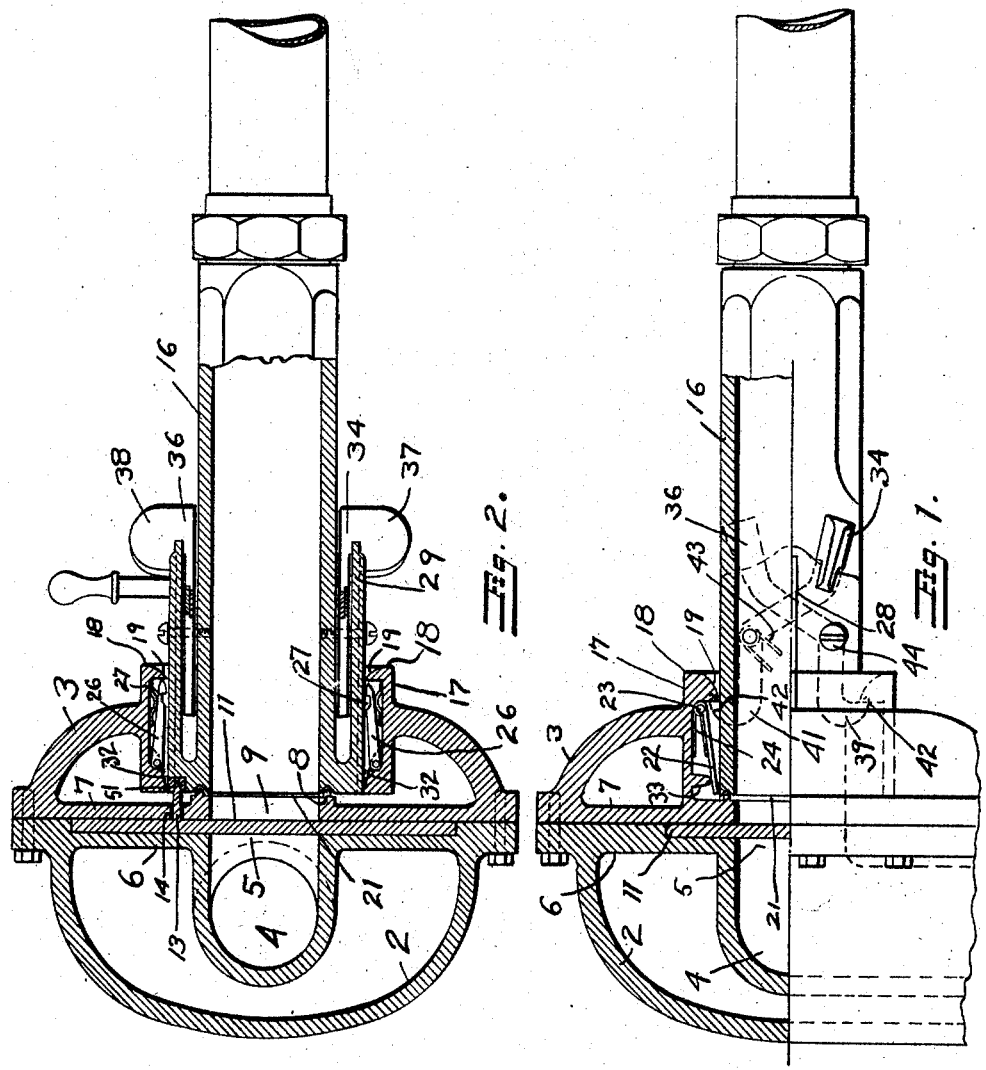

1,303,449.

Patented May 13, 1919.
2 SHEETS—SHEET 2.

WITNESS
J. H. Morgan

INVENTOR.
FERDINANDO ANTONIETTI.
BY White & Prost
ATTORNEYS

UNITED STATES PATENT OFFICE.

FERDINANDO ANTONIETTI, OF SAN FRANCISCO, CALIFORNIA.

FIRE-HYDRANT AND COUPLING THEREFOR.

1,303,449. Specification of Letters Patent. Patented May 13, 1919.

Application filed April 22, 1918. Serial No. 229,914.

*To all whom it may concern:*

Be it known that I, FERDINANDO ANTONIETTI, a citizen of Switzerland, and a resident of the city and county of San Francisco and State of California, have invented a new and useful Fire-Hydrant and Coupling Therefor, of which the following is a specification.

My invention relates to fire hydrants and couplings therefor.

An object of the invention is to provide a coupling with which a hose can be connected to a hydrant, and the water turned into the hose very quickly.

Another object of the invention is to provide a coupling which is connected or disconnected with the hands only.

Another object of the invention is to provide a hydrant and a coupling for connecting a hose thereto, in which is incorporated means for opening the valve in said hydrant to permit water to flow into said hose.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a half sectional view taken in a horizontal plane.

Fig. 2 is a side elevation, part of the structure being broken away.

My invention comprises a fire hydrant and a plug nozzle coupling therefor. The plug nozzle arranged on one end of a hose is adapted to be thrust through an aperture in the hydrant casing, normally closed by locked swinging doors. Merely thrusting the plug nozzle against the doors unlocks them and permits the plug nozzle to seat and be locked upon the discharge aperture of the hydrant, and also establishes a connection between the valve controlling the flow of water from said discharge aperture and a lever carried upon the plug nozzle. Movement of the lever opens the valve and permits water to flow into the hose. Thus the whole operation of forming a connection between the plug nozzle in the fireman's hands and the fire hydrant is comprised in two movements: the first, thrusting the plug nozzle into the casing of the hydrant as far as it will go; the second, pushing a lever handle through a short arc.

Figure 3:
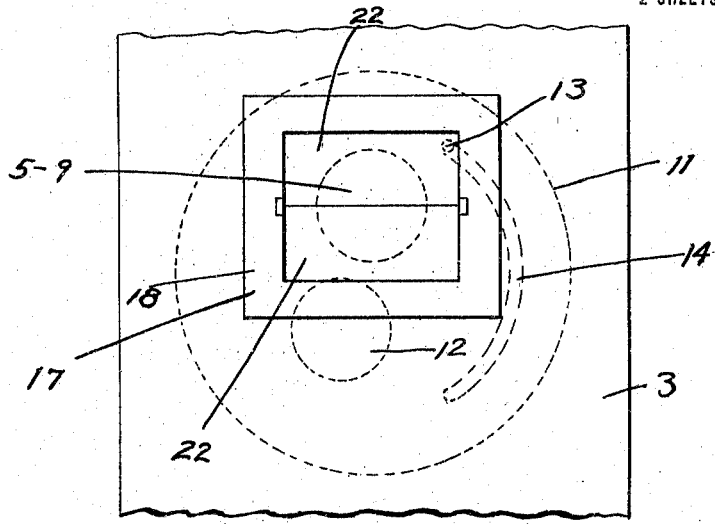
Fig. 3 is a front elevation of the housing before the insertion of the plug nozzle.
Figure 4:
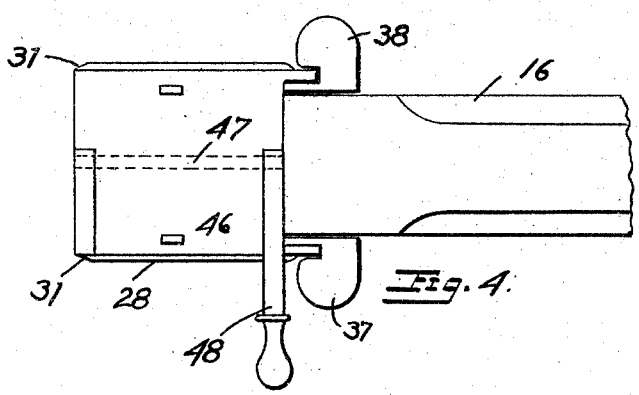
Fig. 4 is a bottom view of the plug nozzle.

In detail, my invention comprises a hydrant casing or housing, conveniently formed in two parts 2 and 3 appropriately secured together. The water supply pipe 4 is arranged in the portion 2 of the casing and communicates at the top thereof with passage 5 which opens upon the flat valve seat formed by the wall or web 6. The casing part 3 is provided with a wall or web 7 also forming a valve seat parallel to and spaced from the first seat 6. Upon the web 7 is formed an annular flange 8 surrounding a passage 9 which is alined with the passage 5 of the pipe 4. Between the two valve seats 6 and 7 is disposed a rotatable disk valve 11. As best shown in Fig. 3, the center of rotation of the disk 11 is vertically below the center of the alined apertures 5—9 and formed in the disk is an opening 12 adapted to be alined with the passages 5—9 when the disk is rotated. Rotation of the disk 11, then, for a portion of a complete revolution alines the opening 12 with the passages 5—9 to permit the discharge of water from the hydrant, or closes the passage 5 and prevents such discharge.

The disk 11 is provided with a stud 13 which projects through a slot 14 formed in the wall 7. The length of the slot determines the amount of movement of the valve disk, insuring full opening of the passage at one extreme and complete closure at the other. Means, presently to be described, are provided upon the plug nozzle 16 for operating the valve disk through connection with the stud 13. Opposite the annular seat 8, the casing 3 is provided with a rectangular housing 17, which forms a socket into which the plug nozzle is thrust. A rectangular opening is formed in the front of the housing 17, the wall on that side forming only a narrow flange 18 adapted to snugly surround the square body of the plug nozzle. The outside surface 19 of the flange 18 is beveled to facilitate the entrance of the plug nozzle, and the end of the latter is preferably provided with a gasket 21 formed complementary to the seat 8, and adapted to permit a tight joint to be formed between the parts when the plug nozzle is pushed into the housing and up against the seat.

Means are provided for closing the opening in the housing when the plug nozzle is withdrawn. On each side of the opening behind the flange 18, a door 22 wide enough to close half the opening, is pivoted on the pin 23, and a spring 24 tends to keep the doors closed. In order to prevent wanton and unnecessary opening of the doors, spring-pressed latches 26 are provided at the sides which lock the doors in the closed position by engaging them in notches 27 therein. These latches are arranged to be released automatically when the plug nozzle is pushed against the doors. The end of each latch is finished flush with the surface 19 of the flange 18, and a ridge 28 is disposed upon the side plates 29 of the plug nozzle, the ends 31 of the ridges engaging and throwing back the latches with the initial entering movement of the plug nozzle. The instant the notches 27 disengage from the doors, the end of the entering nozzle forces back the two doors, the latches 26 bearing upon the ridges 28 as the plug nozzle is pushed to its seat.

In order to insure instant and exact alinement of the plug nozzle with the seat 8, inclined ridges 32 are disposed at the sides of the housing. Lugs 33 are disposed on the top and bottom to limit the backward swinging of the doors 22. As the plug nozzle approaches its seat, the doors 22 above and below and the ridges 32 on the sides, accurately guide the end of the nozzle and prevent lateral displacement thereof on the seat.

Means are provided for retaining the nozzle 16 within the housing and upon the seat 8 so that a continuous and tight conduit is formed, and this is accomplished by arranging latches upon the plug nozzle, which automatically engage the housing when the nozzle is thrust in, and which are manually released so that the nozzle may be withdrawn. On both the sides of the plug nozzle, a pair of latch levers 34 and 36 are pivoted below the plates 29. The levers cross each other, so that by pressing the adjacent wings 37 and 38 respectively, together, the hooked ends 39 and 41 respectively, which project from the sides of the nozzle, are withdrawn from their seats formed on the inside of the flange 18. The front edges 42 of the latch levers are beveled so that they offer no resistance to the entrance of the plug nozzle into the housing, and a spring 43 on each lever tends to keep the hooked ends 39 and 41 extended. The pivot upon which each latch lever is mounted is preferably the smooth shank of a cap screw 44, which also serves to secure the plate in place.

Figure 5:
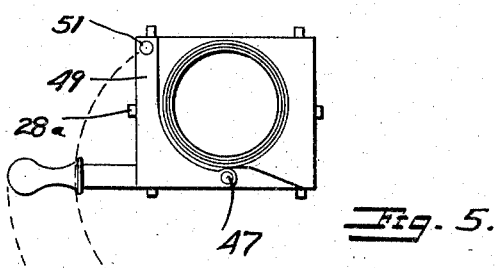
Fig. 5 is an end view of the plug nozzle.

Arranged in suitable bearings disposed preferably in the bottom wall 46 is a rotatable shaft 47 parallel to the axis of the nozzle. The parts are so proportioned, that with the plug nozzle inserted into the housing 17, the axis of rotation of the shaft is alined with the axis of rotation of the valve disk. At one end the shaft is rigidly attached to a lever handle 48 with which the shaft may be turned. Normally the handle lies snugly against the bottom of the plug nozzle, extending outwardly on the side thereof. On the outer end of the shaft is rigidly secured a bent lever 49, which normally lies in a recess formed in the bottom and side of the plug nozzle at the extreme end thereof so that the planes of the outer surfaces of the lever are coincident with the planes of the adjacent surfaces of the plug nozzle. Since the ridge 28 upon one side of the plug nozzle is interrupted by the recess in which the lever lies, the lever is provided with a ridge 28$^a$ alined with the ridge 28 on that side so that the ridge extends to the end of the plug nozzle. Movement of the handle 48 downwardly through the arc A, Fig. 5, will therefore swing the lever 49 about the same axis through a corresponding arc B. The free end of the lever 49 is provided with a conical socket 51 adapted to receive the end of the stud 13 which is also preferably conical on its end, when the plug nozzle is thrust home to its seat within the housing 17. The handle 48 is thus mediately connected to the valve disk 11 through the shaft 47, lever 49 and stud 13, and movement of the handle is accompanied by corresponding movement of the valve disk to open or close the passage 5—9.

*Operation.*

When it is desired to connect the hose 52 to the hydrant, the plug nozzle is merely thrust within the flange 18 and against the doors 22. The ends of the ridges 28 release the latches 26, which permits the doors to swing back before the entering plug nozzle. As the end of the nozzle seats against the annular seat 8, the latch levers snap into hooked engagement with the inside of the flange 18 and securely retain the nozzle upon its seat, and the stud 13 seats within its socket in the end of the lever 49. The lever handle 48 is then pushed downwardly as far as it will go, which conveniently may be about 120° of arc. This rotates the valve disk and opens the passage 5—9. Returning the handle to first position shuts off the water and the plug nozzle is then detached by pressing the wings 37 and 38 of the latch levers together with the two hands. With the release of the hooked ends 39 and 41 of the levers from their seats in the flange 18, the plug nozzle may be pulled out of the housing, the doors swinging shut after it, and the latches 26 snapping back into place to retain the doors in the closed position.

I claim:

1. In combination, a pipe, a valve for controlling the flow of water through said pipe, a nozzle adapted to be connected to said pipe, and means on said nozzle for operating said valve.

2. In combination, a pipe, a valve for controlling the flow of water through said pipe, a casing surrounding said pipe, a plug nozzle adapted to be inserted in said casing to connect with said pipe, and means on said plug nozzle for operating said valve.

3. In combination, a pipe terminating in a seat, a casing surrounding said seat, a valve for controlling the flow of water through said pipe, a plug nozzle adapted to be inserted into said casing to abut against said seat, means for retaining said nozzle on said seat, and means on said nozzle for operating said valve.

4. In combination, a casing, a pipe terminating in a seat arranged in said casing, a plug nozzle adapted to be inserted into said casing to abut against said seat, a valve in said casing for controlling the flow of water through said pipe, a handle on said nozzle for operating said valve, and means engaging automatically upon the insertion of said plug nozzle for connecting said handle and said valve.

5. In combination, a pipe, a valve for controlling the flow of water through said pipe, a casing surrounding said pipe, a plug nozzle adapted to be inserted in said casing to connect with said pipe, a handle on said nozzle, and means automatically engaged on the insertion of said nozzle into said casing for operatively connecting said handle and said valve.

6. In combination, a pipe terminating in an annular seat, a casing surrounding said pipe and provided with a housing adjacent said seat, a valve for controlling the flow of water through said pipe, a plug nozzle adapted to be inserted into said housing to abut against said seat, means for retaining said nozzle upon said seat, and means on said nozzle automatically engaged on the insertion of said nozzle into said casing for operating said valve.

7. In combination, a pipe, a valve for controlling the flow of water through said pipe, a casing surrounding said pipe, a plug nozzle adapted to be inserted in said casing to connect with said pipe, means automatically engageable and manually releasable for retaining said nozzle on said seat, a handle on said nozzle, and means automatically engageable and releasable for connecting said handle and said valve.

8. In combination, a pipe, a casing surrounding said pipe, an apertured rotatable disk arranged in said casing to control the flow of water through said pipe, a nozzle adapted to be connected with said pipe, a handle on said nozzle, and means mediately connecting said handle and said disk.

9. In combination, a pipe, a casing surrounding said pipe, an apertured rotatable disk arranged in said casing across the discharge passage of said pipe, a plug nozzle adapted to be inserted in said casing to connect with said pipe, and means on said plug nozzle automatically engageable with said disk for operating said disk to control the flow of water through said pipe.

10. In combination, a pipe, a casing surrounding said pipe, an apertured rotatable disk arranged in said casing across the discharge passage of said pipe, a plug nozzle adapted to be inserted in said casing to connect with said pipe, a lever on said plug nozzle, a handle for operating said lever, and means for automatically connecting said lever and said disk when said plug nozzle is inserted in said casing.

11. In combination, a casing, spaced walls in said casing, a pipe in said casing opening through one of said walls, the other wall being provided with an aperture therethrough in alinement with said pipe passage, a seat disposed about said aperture, a plug nozzle adapted to be inserted in said casing to abut against said seat, automatically engageable and manually releasable means for retaining said nozzle on said seat, an apertured disk disposed between said walls to block the passage from said pipe, means on said nozzle for engaging said disk when said nozzle rests against said seat, and means on said nozzle for operating said engaging means to rotate said disk whereby the aperture therein is alined with the passage in said pipe.

12. In combination, a casing, spaced walls in said casing, a pipe in said casing opening through one of said walls, the other wall being provided with an aperture therethrough in alinement with said pipe passage, a seat disposed about said aperture, a plug nozzle adapted to be inserted in said casing to abut against said seat, automatically engageable and manually releasable means for retaining said nozzle on said seat, an apertured disk disposed between said walls to block the passage from said pipe, a stud projecting from said disk, a shaft disposed on said nozzle, a lever fixed to said shaft on the end of said nozzle and having a socket therein adapted to receive said stud when said plug nozzle is inserted into said casing, and a handle on said shaft exterior of said casing whereby said shaft and lever may be operated to rotate said disk.

In testimony whereof, I have hereunto set my hand at San Francisco, California, this 13th day of April 1918.

FERDINANDO ANTONIETTI.

In presence of—
H. G. PROST.

Copies of this patent may be obtained for five cents each, by addressing the "Commissioner of Patents, Washington, D. C."